United States Patent [19]

Yoshizumi et al.

[11] Patent Number: 5,216,077
[45] Date of Patent: Jun. 1, 1993

[54] RUBBER-MODIFIED PHENOLIC RESIN COMPOSITION AND METHOD OF MANUFACTURING THE SAME

[75] Inventors: Akira Yoshizumi, Yokohama; Shinetsu Fujieda, Kawasaki; Ken Uchida, Tokyo; Naoko Kihara, Matsudo; Kazuhiro Sawai, Kawaguchi; Tsutomu Nagata, Iwatsuki; Shinji Murakami; Shigeyuki Kouchiyama, both of Kawaguchi, all of Japan

[73] Assignees: Kabushiki Kaisha Toshiba, Kawasaki; Toshiba Chemical Corporation, Tokyo, both of Japan

[21] Appl. No.: 874,226

[22] Filed: Apr. 27, 1992

Related U.S. Application Data

[60] Continuation of Ser. No. 662,512, Feb. 28, 1991, abandoned, which is a continuation of Ser. No. 463,465, Jan. 11, 1990, abandoned, which is a division of Ser. No. 243,719, Sep. 13, 1988, Pat. No. 4,916,174.

Foreign Application Priority Data

Jan. 6, 1988 [JP] Japan .................. 63-1031

[51] Int. Cl.$^5$ .................. C08L 51/04; C08L 61/10; C08L 63/00
[52] U.S. Cl. .................. 525/68; 525/132; 525/436; 525/109; 525/119; 524/504; 524/509
[58] Field of Search .................. 525/68, 132

[56] References Cited

U.S. PATENT DOCUMENTS

| | | | |
|---|---|---|---|
| 3,536,783 | 10/1970 | Jeffreys et al. | 525/152 |
| 4,226,950 | 10/1980 | Holub et al. | 525/68 |
| 4,332,858 | 6/1982 | Saitoh et al. | 525/301 |
| 4,378,450 | 3/1983 | Ema et al. | 525/132 |

FOREIGN PATENT DOCUMENTS 0159872  9/1984  Japan .................. 525/132

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

A rubber-modified phenolic resin composition contains a novolak-type phenolic resin in which at least one modifying agent selected from the group consisting of an ABS resin and an MBS resin is homogeneously dispersed. The composition has good impact resistance and thermal shock resistance. The composition is prepared by adding at least one modifying agent described above to a novolak-type phenolic resin which is heated and melted at its softening point or more, so that the modifying agent is homogeneous dispersed in the resin. The resin composition is suitably used as a curing agent for an epoxy resin encapsulant for sealing electronic devices.

4 Claims, No Drawings

RUBBER-MODIFIED PHENOLIC RESIN COMPOSITION AND METHOD OF MANUFACTURING THE SAME

This application is a continuation of application Ser. No. 07/662,512, filed on Feb. 28, 1991, now abandoned, which was a continuation of application Ser. No. 07/463,465, filed on Jan. 11, 1990, which was a Divisional of application Ser. No. 07/243,719, filed on Sep. 13, 1988 U.S. Pat. No. 4,416,174, all now abandoned.

BACKGROUND OF THE INVENTION

1. Field of the Invention

The present invention relates to a rubber-modified phenolic resin composition which can be used as a main resinous component or a curing agent for a curable resin, and a method of manufacturing the same. More particularly, it relates to a rubber-modified phenolic resin composition which can be used to form a cured product having good impact resistance and thermal shock resistance when the composition is cured and which can give good impact resistance and thermal shock resistance to a cured product when the composition is used as a curing agent for other curable resins. The present invention also relates to an encapsulant for electronic or electric components, having low stress property and good moisture resistance.

2. Description of the Prior Art

When a phenolic resin is cured, it can form a cured product which is lustrous, which is not easily fused, which has good weathering resistance, water resistance, mechanical strength, and thermal and electrical insulation properties, and which is not easily affected by chemicals. For this reason, the phenolic resin is widely used as varnish, a laminated sheet material, a molding material, and an insulating material in various industrial fields such as fields of electrics and electronics.

In addition, a phenolic resin, especially a novolak-type phenolic resin is also used as a curing agent for other curable resins such as an epoxy resin and a bismaleimide resin. A composition mainly consisting of an epoxy resin is widely used as a material for sealing electronic components such as diodes, transistors, and ICs. Examples of a curing agent for an epoxy resin other than the novolak-type phenolic resin are acid anhydrides and aromatic amines. However, an epoxy resin composition using the novolak-type phenolic resin as a curing agent has good molding properties and moisture resistance, has no toxicity, and is inexpensive as compared with the one using other curing agents. Therefore, the epoxy resin composition using the novolak-type phenolic resin as a curing agent is widely used as an encapsulant for electronic devices such as semiconductor devices.

However, a cured phenolic resin is brittle and has a poor impact resistance although it has the above superior properties. When such a phenolic resin is used as a curing agent for an epoxy resin or a polyimide resin, these drawbacks also appear.

In addition, the epoxy resin composition using the novolak-type phenolic resin as a curing agent shrinks when it is molded and cured, thereby degrading the reliability of semiconductor devices sealed therein. That is, when a semiconductor device sealed in such a resin composition is subjected to a thermal cycle test, open of a bonding wire, resin cracks, pellet cracks, and the like occur. For this reason, such semiconductor devices cannot function as electronic components.

Therefore, it is conventionally proposed to add tung oil or polybutadiene having a functional group to the novolak-type phenolic resin to modify it. However, a cured product obtained by curing a modified novolak-type phenolic resin prepared in such manner has poor electric properties, the surface of the cured product is contaminated, and its strength is degraded. Furthermore, the cured product obtained from above-mentioned novolak-type phenolic resin does not have sufficiently good impact resistance, thermal shock resistance, and low stress property.

SUMMARY OF THE INVENTION

It is, therefore, a first object of the present invention to provide a rubber-modified phenolic resin composition which can form a cured product having good impact resistance and thermal shock resistance and is free from degradation in electric properties, contamination on the surface, and degradation in strength, and a method of manufacturing the same.

It is a second object of the present invention to provide a highly-reliable encapsulant which has low stress property without variations and good moisture resistance and which maintains advantageous properties of a conventional epoxy resin composition.

A rubber-modified phenolic resin composition according to the present invention comprises:
a novolak-type phenolic resin; and
at least one modifying agent selected from the group consisting of ABS resin particles and MBS resin particles dispersed in the novolak-type phenolic resin.

The rubber-modified phenolic resin composition according to the present invention is manufactured by heating a novolak-type phenolic resin to its softening point or more to melt the resin, and mixing particles of at least one modifying agent selected from the group consisting of an ABS resin and an MBS resin in the resultant molten material so that the particles are uniformly dispersed in the molten novolak-type phenolic resin.

A encapsulant according to the present invention contains (A) the above rubber-modified phenolic resin composition, (B) an epoxy resin, and (C) an inorganic filler as essential components.

In the present invention, an MBS resin is preferable as a modifying agent. More preferably, the MBS resin comprises a core consisting of styrene-butadiene rubber (to be referred to as SBR hereinafter) and an outer layer consisting of methyl methacrylate graft component which is graft-polymerized to the core.

DETAILED DESCRIPTION OF THE PREFERRED EMBODIMENTS

In the rubber-modified phenolic resin composition of the present invention, a novolak-type phenolic resin is used as a phenolic resin. The novolak-type phenolic resin does not liberate water upon curing, has a long pot life, and a good heat resistance among phenolic resins. Any novolak-type phenolic resin can be used in the present invention as long as it has two or more phenolic hydroxyl groups in its molecule. Examples of the novolak-type phenolic resin are a phenolic novolak, a cresol novolak resin, a tert-butyl phenolic novolak, a nonyl phenolic novolak, a phenolic aralkyl resin, and a dicyclopentadiene phenolic novolak. Of these novolak-type phenolic resins, the phenolic novolak is most preferable in terms of molding properties and the strength. More specifically, preferable examples are SHONOL BRG-555 (SHOWA HIGH POLYMER CO., LTD., softening point=68° C., melting viscosity=2.4 P at 125° C.), SHONOL BRG-556 (SHOWA HIGH POLYMER CO., LTD., softening point=80° C., melting viscosity=1.8 P at 150° C.), SHONOL BRG-557 (SHOWA HIGH POLYMER CO., LTD., softening point=87° C., melting viscosity=3.0 P at 150° C.), SHONOL BRG-558 (SHOWA HIGH POLYMER CO., LTD., softening point=97° C., melting viscosity=6.2 P at 150° C.), VARCUM TD-2131 (DAINIPPON INK & CHEMICALS, INC., softening point=80° C., melting viscosity=3.3 P at 150° C.), and VARCUM TD-2093 (DAINIPPON INK & CHEMICALS, INC., softening point=100° C., melting viscosity=30 P at 150° C.).

In the rubber-modified phenolic resin of the present invention, at least one resin selected from the group consisting of an ABS resin and an MBS resin is used as a modifying agent. The ABS resin represents an acrylonitrile-butadiene-styrene copolymer and the MBS resin represents a methyl methacrylate-butadiene-styrene copolymer. The ABS and MBS resins are well known in the art.

The ABS resin used in the present invention is most preferably a graft copolymer, i.e., a copolymer comprising a core consisting of a rubber component and an outer layer consisting of a graft component which is graft polymerized to the core. Examples which are mainly used as the rubber component forming the core are polymers mainly consisting of butadiene rubber. Examples of the graft component which is graft polymerized to the rubber component are acrylonitrile; styrene copolymer. Note that styrene is preferable as the aromatic vinyl monomer.

Examples of the ABS resin which can be used in the present invention are KRALASTIC K-2540 (SUMITOMO NOUGATUCK Co., Ltd., specific gravity=1.01, heat distortion temperature=81° C., flexural modulus=12000 kg/cm$^2$, tensile strength=300 kg/cm$^2$), KRALASTIC K-3125 (SUMITOMO NOUGATUCK Co., Ltd., specific gravity=1.00, heat distortion temperature=79° C., tensile strength=280 kg/cm$^2$), TELALLOY A-10 (Kanegafuchi Chemical Industry Co., Ltd., specific gravity=1.05), TELALLOY A-50 (Kanegafuchi Chemical Industry Co., Ltd., specific gravity=1.06), JSR ABS 10 (Japan Synthetic Rubber Co., Ltd., specific gravity=1.03, heat distortion temperature 86° C., flexural modulus=18000 kg/cm$^2$, tensile strength=350 kg/cm$^2$), JSR ABS 15 (Japan Synthetic Rubber Co., Ltd., specific gravity=1.05, heat distortion temperature=89° C., flexural modulus=27000 kg/cm$^2$, tensile strength=500 kg/cm$^2$), JSR ABS 42 (Japan Synthetic Rubber Co., Ltd., specific gravity=1.05, heat distortion temperature=105° C., flexural modulus=27000 kg/cm$^2$, tensile strength=800 kg/cm$^2$), JSR ABS 47 (Japan Synthetic Rubber Co., Ltd., specific gravity=1.05, heat distortion temperature=103° C., flexural modulus=27000 kg/cm$^2$, tensile strength=530 kg/cm$^2$), and JSR ABS 55 (Japan Synthetic Rubber Co., Ltd., specific gravity=1.07, heat distortion temperature=86° C., flexural modulus=20000 kg/cm$^2$ tensile strength=430 kg/cm$^2$).

Note that in the present invention, the ABS resin includes a copolymer prepared by polymerizing a small amount of a monomer which can be polymerized to the above copolymers.

As in the ABS resin, the MBS resin used in the present invention is most preferably a graft copolymer. This MBS resin is a polymer containing methyl methacrylate (to be sometimes referred to as MMA hereinafter) in place of acrylonitrile in the ABS resin, i.e., a polymer comprising a core of rubber particles mainly consisting of butadiene (especially, a styrene-butadiene copolymer) and an outer layer formed by graft polymerized MMA or MMA and at least one aromatic vinyl monomer to the core. As in the ABS resin, styrene is preferable as the aromatic vinyl monomer.

The MBS resin used in the present invention can be prepared as follows, as is disclosed "Resin with Advanced Function obtained by Modifying Agent having High Molecular Weight", CMC Technical Report No. 8. First, 100 parts of a latex containing 40 parts of SBR consisting of 75% of butadiene and 25% of styrene and having a grain size of 0.1 μm are mixed with 150 parts of water. Then, 0.15 parts of sodium sulfoxylate formaldehyde, 33 parts of styrene, and 0.2 parts of cumene hydroperoxide are added to the resultant mixture and agitated in a closed vessel at 60° C. for five hours. As a result, almost all styrene is polymerized to the latex. After the reaction, 27 parts of MMA and 0.2 parts of cumene hydroperoxide are added to the resultant material and agitated at 60° C. for four hours, thereby graft-polymerizing MMA. The graft latex prepared as described above is subjected to precipitating, filtering, washing, and drying, thereby obtain a final product.

Note that the MBS resin used in the present invention preferably contains 70 wt % or less of butadiene and 15 wt % or more of MMA. If an MBS resin having a composition falling outside this range is used, the outer appearance of a molded product tends to be degraded.

Examples of the MBS resin used in the present invention are B-22 (Kanegafuchi Chemical Industry Co., Ltd., SBR component=about 45%), B-28 (Kanegafuchi Chemical Industry Co., Ltd., SBR component=about 45%), B-56 (Kanegafuchi Chemical Industry Co., Ltd., SBR component=about 65%), 68K4 (Japan Synthetic Rubber Co., Ltd., SBR component=about 55%), KANEACE FK (Kanegafuchi Chemical Industry Co., Ltd.), BTA731 (Kureha Chemical Industry Co., Ltd.), and BTA IIINX (Kureha Chemical Industry Co., Ltd.).

Note that butadiene-acrylonitrile rubber can be used together with butadiene-styrene rubber as the rubber component of the core.

In the rubber-modified phenolic resin of the present invention, both the ABS and MBS resins as a modifying agent are used in the form of particles or powder. These particles preferably have a mean diameter of 50 to 100 μm. It is believed that at least part of the outer layer of these particles is melted with the novolak-type phenolic resin at an interface therebetween.

In the rubber-modified phenolic resin of the present invention, an amount of the modifying agent to be dispersed in the novolak-type phenolic resin is preferably 2 to 100 parts by weight with respect to 100 parts by weight of the novolak-type phenolic resin. More preferably, an amount of the modifying agent is 10 to 50 parts by weight with respect to 100 parts by weight of the novolak-type phenolic resin. If an amount of the modifying agent is less than 2 parts by weight, the impact resistance and thermal shock resistance cannot be effectively improved. If an amount of the modifying agent exceeds 100 parts by weight, the modifying agent cannot be homogeneously dispersed in the novolak-type phenolic resin.

In order to manufacture the rubber-modified phenolic resin of the present invention, the novolak-type phenolic resin is heated to its softening point or more to be melted, and particles of the modifying agent is added to the molten material to be homogeneously dispersed in the novolak-type phenolic resin.

The heating/melting temperature of the novolak-type phenolic resin need only be the softening point or more of the novolak-type phenolic resin but is preferably 110° C. or more. When the novolak-type phenolic resin is heated to 110° C. or more, the modifying agent can be dispersed in the novolak-type phenolic resin more homogeneously, and affinity at the interface between the modifying agent and the novolak-type phenolic resin can be improved. This is because the ABS and MBS resins can be softened if a temperature is 110° C. or more. Therefore, when the novolak-type phenolic resin is heated to 110° C. or more to be melted and the modifying agent is added and agitated for at least ten minutes to be dispersed, a good result can be obtained.

In this case, an agitation method of dispersing the modifying agent in the novolak-type phenolic resin is not limited. Examples of the method are agitation using a mixing blade in a flask, agitation using a universal mixing machine, agitation using a roll, and agitation using a homogenizer in a melting vessel.

Of the above methods, it is most preferable to heat and melt the novolak-type phenolic resin at 150° C. or more in the universal mixing machine, add the modifying agent to the resin, and then agitate the resultant material for 30 minutes or more at a reduced pressure of 30 mmHg or less.

The following methods may be used to add the modifying agent to the novolak-type phenolic resin as well as the above methods:

1) a method of supplying the modifying agent in a reaction vessel upon synthesis of the novolak-type phenolic resin; and
2) a method of adding the modifying agent in a solvent in which the novolak-type phenolic resin has been dissolved and then removing the solvent.

However, a satisfactory result cannot be obtained by neither of the above methods. The reason for this is believed that an outer layer consisting of a graft component which is graft polymerized to the core is solved to the novolak-type phenolic resin.

The rubber-modified phenolic resin composition according to the present invention can be widely used as a main component for varnish, a laminated sheet material, a molding material, and an insulating material in various industrial fields such as fields of electrics and electronics. In addition, the rubber-modified phenolic resin composition of the present invention can be used as a curing agent for other curable resins such as an epoxy resin and a maleimide resin. In particular, the resin composition of the present invention is suitably used in an electronic device-encapsulant containing an epoxy resin.

As described above, the encapsulant of the present invention contains (A) the rubber-modified phenolic resin composition of the present invention, (B) an epoxy resin, and (C) an inorganic filler.

Epoxy resin (B) need only have at least two epoxy groups in its molecule. Any epoxy resin which is generally used as a encapsulant may be used regardless of its molecular structure and molecular weight as long as it satisfies the above condition. Examples of the epoxy resin used in the encapsulant include a bisphenol type aromatic epoxy resin, an alicyclic epoxy resin such as a cyclohexane derivative epoxy resin, and an epoxy novolak resin represented by the following formula:

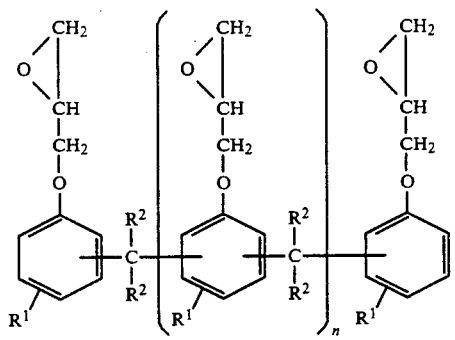

where $R^1$ represents a hydrogen atom, a halogen atom, or an alkyl group, R2 represents a hydrogen atom or an alkyl group, and n represents an integer of 1 or more.

These epoxy resins may be used singly or in a combination of two or more resins.

Examples of inorganic filler (C) are silica powder, alumina powder, antimony trioxide powder, talc powder, calcium carbonate powder, titanium oxide powder, clay, asbestos, mica, red iron oxide powder, glass fiber, and carbon fiber. These inorganic fillers may be used singly or in a combination of two or more fillers. Of the above inorganic fillers, silica or alumina is most preferable. In the encapsulant of the present invention, the content of the inorganic filler is preferably 25 to 90 wt % with respect to the total amount of the composition. If the content of the inorganic filler is less than 25%, it is difficult to obtain good moisture resistance, heat resistance and mechanical property of a cured product made by curing the encapsulant, and good molding properties of the encapsulant. If the content of the inorganic filler exceeds 90 wt %, the melt viscosity of the composition is increased, and the molding properties are degraded.

The encapsulant of the present invention contains rubber-modified phenolic resin (A) as a curing agent. All the above-mentioned rubber-modified phenolic resins can be suitably used as a curing agent for the encapsulant of the present invention. However, the rubber modified phenolic resin using only an MBS resin as a modifying agent is most preferable. In the encapsulant of the present invention, the content of rubber-modified phenolic resin composition (A) is preferably 1 to 30 wt % with respect to the total amount of the composition. If the content is less than 1 wt %, it is difficult to obtain, especially, a stress-reducing effect. If the content exceeds 30 wt %, molding properties of the encapsulant or the moisture resistance and electrical properties of the cured product are degraded. A ratio of the novolak-type phenolic resin and the epoxy resin is preferably set such that a molar ratio between an epoxy group of the epoxy resin and a phenolic hydroxyl group of the novolak-type phenolic resin falls within the range of 0.1 to 10. If the molar ratio falls outside the range, the molding properties of the encapsulant and the moisture resistance and electrical properties of the cured product are degraded.

The encapsulant of the present invention may contain other additives in addition to the above essential components if necessary. Examples of the additive are natural waxes, synthetic waxes, metal salts of straight-chain aliphatic acid, acid amide, esters, a lubricant such as paraffins, chlorinated paraffin, bromotoluene, a flame-retardant such as hexabromobenzene, a silane coupling agent, and various curing accelerators.

In order to prepare the encapsulant of the present invention, it is important to independently prepare the rubber-modified phenolic resin as a curing agent for the epoxy resin in accordance with the manufacturing method of the present invention described above. Other procedures such as mixing order of the rubber-modified phenolic resin, the epoxy resin, and the inorganic filler, process conditions, and the like are not particularly limited. However, the encapsulant of the present invention is normally prepared as follows. First, a required amount of the rubber-modified phenolic resin composition (A) and the epoxy resin (B) are ground. Then, a predetermined amount of the inorganic filler (C) and, if necessary, other additives are added to the resultant material, and the components are sufficiently mixed by a mixer or the like to be homogenized. After the mixing, the resultant mixture is heated and kneaded using a heat roll, an extruder machine or a kneader. Thereafter, the heated/kneaded mixture is cooled to solidify and then ground in an adequate size.

It may be through that the encapsulant of the present invention may be manufactured by the following methods in consideration of only a composition of the encapsulant. That is, the novolak-type phenolic resin and the modifying agent are simultaneously added to the epoxy resin and the mixture is heated and kneaded; or the modifying agent is added to and mixed with the epoxy resin and then the novolak-type phenolic resin is added to and mixed with the resultant material. However, a encapsulant having good characteristics especially a low stress property cannot be obtained from a composition manufactured by either of these methods. It can be obtained when the rubber-modified phenolic resin is independently prepared and other components such as the epoxy resin and the inorganic filler are added to the rubber-modified phenolic resin in accordance with the method of the present invention.

Examples of the present invention will be described below.

EXAMPLE 1

Preparation of Rubber-Modified Phenolic Resin (A)

2000 g of a novolak-type phenolic resin (BRG-555) were melted at 150° C. in a universal mixing machine. 500 g of an ABS resin (A-10, particles having a grain size of 500 $\mu$m or more were removed) were added to the molten phenolic resin and the mixture was agitated for five minutes. Then, the molten resin was removed from the mixing machine, cooled, and then ground. The prepared resin was used as rubber-modified phenolic resin (A).

EXAMPLE 2

Preparation of Rubber-Modified Phenolic Resin (B)

2000 g of a novolak-type phenolic resin (BRG-555) were melted at 150° C. in a universal mixing machine. 500 g of an ABS resin (A-10, particles having a grain size of 500 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (B).

EXAMPLE 3

Preparation of Rubber-Modified Phenolic Resin (C)

2000 g of a novolak-type phenolic resin (BRG-555) were melted at 150° C. in a universal mixing machine. 500 g of an MBS resin (68K4, particles having a grain size of 350 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (C).

EXAMPLE 4

Preparation of Rubber-Modified Phenolic Resin (D)

2000 g of a novolak-type phenolic resin (BRG-555) were melted at 150° C. in a universal mixing machine. 1000 g of an MBS resin (68K4, particles having a grain size of 350 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (D).

EXAMPLE 5

Preparation of Rubber-Modified Phenolic Resin (E)

2000 g of a novolak-type phenolic resin (BRG-555) were melted at 150° C. in a universal mixing machine. 500 g of an MBS resin (B-56, particles having a grain size of 420 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (E).

EXAMPLE 6

Preparation of Rubber-Modified Phenolic Resin (F)

2000 g of a novolak-type phenolic resin (BRG-556) were melted at 150° C. in a universal mixing machine. 500 g of an MBS resin (68K4, particles having a grain size of 350 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (F).

EXAMPLE 7

Preparation of Rubber-Modified Phenolic Resin (G)

2000 g of a novolak-type phenolic resin (BRG-555) were melted at 150° C. in a universal mixing machine. 200 g of an MBS resin (68K4, particles having a grain size of 350 $\mu$m or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (G).

EXAMPLE 8

Preparation of Rubber-Modified Phenolic Resin (H)

2000 g of a novolak-type phenolic resin (BRG-555) were melted at 150° C. in a universal mixing machine. 1600 g of an MBS resin (68K4, particles having a grain size of 350 μm or more were removed) were added to the molten phenolic resin and the mixture was agitated for 30 minutes while a pressure in the mixing machine was reduced to 20 mmHg. Then, the molten resin was removed from the mixing machine, cooled, and then ground. The prepared resin was used as rubber-modified phenolic resin (H).

COMPARATIVE EXAMPLE 1

Preparation of Rubber-Modified Phenolic Resin (I)

2000 g of a novolak-type phenolic resin (BRG-555) were melted at 150° C. in a universal mixing machine. 500 g of liquid rubber (polybutadiene CTB-2000X162 having a carbonyl group at its terminal, Ube Industries, Ltd.) were added to the molten phenolic resin and the mixture was agitated for 30 minutes while the pressure in the mixing machine was reduced to 20 mmHg. Then, the molten resin was removed from the mixing machine, cooled, and then ground. The prepared resin was used as rubber-modified phenolic resin (I).

COMPARATIVE EXAMPLE 2

Preparation of Rubber-Modified Phenolic Resin (J)

2000 g of a novolak-type phenolic resin (BRG-555) were melted at 150° C. in a universal mixing machine. 500 g of norbornene rubber (NORSOLEX, Nippon Zeon Co., Ltd.) were added to the molten phenolic resin and the mixture was agitated for 30 minutes while the pressure in the mixing machine was reduced to 20 mmHg. Then, the molten resin was removed from the mixing machine, cooled, and then ground. The prepared resin was used as rubber-modified phenolic resin (J).

COMPARATIVE EXAMPLE 3

Preparation of Rubber-Modified Phenolic Resin (K)

200 g of a novolak-type phenolic resin (BRG-555) were dissolved in 2000 cc of tetrahydrofuran (THF). 20 g of an MBS resin were dissolved (partially dissolved and partially dispersed) in 1000 cc of THF at 60° C.. These solutions were mixed and sufficiently agitated in a reaction vessel. THF was removed by evaporation from the solution mixture to prepare rubber-modified phenolic resin (K).

Physical properties of the rubber-modified phenolic resins according to Example 1 to 8 and Comparative Example 1 to 3 prepared as described above were examined. Results are summarized in Table 1 below.

TABLE 1

| | Rubber-Modified Phenolic Resin | Softening Point (°C.) | Melting Viscosity [150° C.] (P) | Appearance |
|---|---|---|---|---|
| Example 1 | (A) | 90 | 4.0 | Dispersed Particles were Visible |
| Example 2 | (B) | 85 | 3.5 | Homogeneous |
| Example 3 | (C) | 83 | 3.4 | Homogeneous |
| Example 4 | (D) | 98 | 6.5 | Homogeneous |
| Example 5 | (E) | 96 | 6.0 | Homogeneous |
| Example 6 | (F) | 100 | 6.2 | Homogeneous |
| Example 7 | (G) | 80 | 3.1 | Homogeneous |
| Example 8 | (H) | 101 | 8.0 | Homogeneous |
| Comparative Example 1 | (I) | 79 | 2.0 | Homogeneous |
| Comparative Example 2 | (J) | 86 | 8.0 | Dispersed Particles were Visible |
| Comparative Example 3 | (K) | 75 | 2.4 | Homogeneous |

Then, the rubber-modified phenolic resins prepared in Examples 1 to 8 and Comparative Examples 1 to 3 were used to prepare phenolic resin compositions, epoxy resin compositions, and polyimide resin compositions by a method described below. A flexural strength, a frexural modulus, a Charpy impact strength, and a thermal shock resistance according to the Olyphant washer method of each composition were examined. In a thermal shock resistance test according to the Olyphant washer method, a thermal shock was applied on a manufactured disk at a cycle of 200° C.×30 minutes and −196° C.×30 minutes, and the number of cycles required until cracks were formed was counted.

As for the epoxy resin and polyimide resin compositions, a glass transition temperature, a thermal coefficient of expansion, a volume resistivity as an index of electric properties, and a melting viscosity and a length of a burr of a molded product as an index of molding properties were examined.

(I) Preparation of Phenolic Resin Composition 20 parts of hexamine, 125 parts of a glass powder, 25 parts of a glass fiber, three parts of stearic acid, and three parts of carbon were added to 100 parts of each of the rubber-modified phenolic resins prepared in Examples 1 to 8 and Comparative Examples 1 to 3. These mixtures were kneaded and granulated, thereby preparing phenolic resin compositions.

Each composition was compression molded at 170° C. for five minutes to manufacture a Charpy test piece and a disk in which an Olyphant washer was embedded.

(II) Preparation of Epoxy Resin Composition

A powder of orthocresol novolak-type epoxy resin (softening point=74° C., equivalent weight of epoxy group=197) was mixed with a powder of each of the rubber-modified phenolic resins prepared in Examples 1 to 8 and Comparative Examples 1 to 3. At this time, amounts of the resins were set such that an equivalent weight ratio between epoxy group and phenolic hydroxyl group became 1:1. One part of triphenylphosphine (a curing catalyst), 290 parts of a powder of fused silica, 1.2 parts of carnauba wax, and 1.2 parts of carbon were added to 100 parts of the resin mixture and the mixture was kneaded. The resultant mixture was cooled to be solidified, and then ground. Then, the prepared powder was compressed into tablets.

Each molding material was low-pressure transfer molded at 175° C. for three minutes to manufacture a Charpy shock test piece and a disk in which an Olyphant washer was embedded. The manufactured test piece and disk were postcured at 180° C. for eight hours.

(III) Preparation of Polyimide Resin Composition

A powder of poly(phenylmethylene) polymaleimide (BMI M-20, Mitsui Toatsu Chemicals, Inc.) was mixed with a powder of each of the rubber-modified phenolic resins prepared in Examples 1 to 8 and Comparative Examples 1 to 3. At this time, amounts of the resins were set such that an equivalent weight ratio between double bond of imide and phenolic hydroxyl group became 1:0.5. One part of triphenylphosphine (a curing catalyst), 275 parts of a powder of fused silica, 2 parts of polyethylene wax, and 1.2 parts of carbon were added to 100 parts of the resin mixture and the mixture was kneaded. The resultant mixture was cooled to be solidified, and then ground. Then, the prepared powder was compressed into tablets.

The obtained tablet was low-pressure transfer molded at 200° C. for three minutes to manufacture a Charpy shock test piece and a disk in which an Olyphant washer was embedded. The manufactured test piece and disk were postcured at 200° C. for eight hours.

Note that Comparative Example 4 in which unmodified novolak-type phenolic resin BRG-555 was used instead of the rubber-modified phenolic resin and Comparative Example 5 in which unmodified novolak-type phenolic resin BRG-556 was used instead of the rubber-modified phenolic resin were similarly tested.

In addition, an epoxy resin composition using a rubber-modified epoxy resin was prepared. In this rubber-modified epoxy resin, an MBS resin was dispersed not in the novolak-type phenolic resin but in the epoxy resin.

COMPARATIVE EXAMPLE 6

An orthocresol novolak-type epoxy resin similar to that used in (II) Preparation of Epoxy Resin Composition was heated and melted at its softening point or more. Then, a MBS resin similar to that used in Example 7 was added to the molten resin in the same amount as in Example 7. After the addition, the resultant material was sufficiently agitated so that the MBS resin was dispersed, thereby preparing a rubber-modified epoxy resin.

Then, an epoxy resin composition was prepared following the same procedures as in (II) except that the above rubber-modified epoxy resin was used instead of the orthocresol novolak-type epoxy resin and a novolak-type phenolic resin same as that used in Example 7 was used instead of the rubber-modified phenolic resin.

These epoxy resin compositions were similarly tested. Results are summarized in Table 2 below.

TABLE 2

|  | Example 1 | Example 2 | Example 3 | Example 4 | Example 5 | Example 6 | Example 7 | Example 8 |
|---|---|---|---|---|---|---|---|---|
| Used Novolak-type Phenolic Resin |  |  |  |  |  |  |  |  |
| Used Rubber-Modified Phenolic Resin | (A) | (B) | (C) | (D) | (E) | (F) | (G) | (H) |
| Phenolic Resin Molding Material |  |  |  |  |  |  |  |  |
| Flexural Strength (kgf/mm$^2$) | 12.3 | 12.4 | 12.4 | 12.9 | 12.7 | 12.6 | 12.3 | 13.1 |
| Flexural Modulus (kgf/mm$^2$) | 1520 | 1460 | 1420 | 1350 | 1370 | 1425 | 1510 | 1330 |
| Charpy Shock Strength (kgf · mm/mm$^2$) | 8.9 | 9.7 | 10.6 | 11.2 | 11.0 | 10.0 | 8.5 | 11.7 |
| Thermal Shock Resistance ($\infty$) | 10 | 14 | 13 | 24 | 20 | 16 | 11 | 30 |
| Epoxy Resin Molding Material |  |  |  |  |  |  |  |  |
| Flexural Strength (kgf/mm$^2$) | 14.9 | 14.6 | 14.6 | 14.8 | 14.8 | 15.0 | 14.2 | 15.0 |
| Flexural Modulus (kgf/mm$^2$) | 1400 | 1350 | 1390 | 1200 | 1250 | 1360 | 1410 | 1180 |
| Charpy Shock Strength (kgf · mm/mm$^2$) | 6.5 | 7.4 | 7.3 | 8.2 | 8.3 | 7.9 | 7.0 | 8.7 |
| Thermal Shock Resistance ($\infty$) | 28 | 29 | 28 | 35 | 34 | 30 | 20 | 46 |
| Glass Transition Temperature (°C.) | 157 | 159 | 157 | 156 | 156 | 158 | 158 | 152 |
| Thermal Coefficient of Expansion (1/°C.) | $1.8 \times 10^{-5}$ | $1.8 \times 10^{-5}$ | $1.8 \times 10^{-5}$ | $1.9 \times 10^{-5}$ | $1.9 \times 10^{-5}$ | $1.8 \times 10^{-5}$ | $1.8 \times 10^{-5}$ | $2.0 \times 10^{-5}$ |
| Volume Resistivity [150° C.]($\Omega$ · cm) | $8.2 \times 10^{13}$ | $9.6 \times 10^{13}$ | $1.1 \times 10^{14}$ | $1.0 \times 10^{14}$ | $9.8 \times 10^{13}$ | $1.0 \times 10^{14}$ | $1.0 \times 10^{14}$ | $1.0 \times 10^{14}$ |
| Melting Viscosity [175° C.](poise) | 250 | 180 | 200 | 170 | 205 | 195 | 220 | 205 |
| Burr Length [5 μm](mm) | 2.5 | 1.2 | 1.2 | 0.8 | 0.9 | 1.1 | 1.9 | 0.4 |
| Polyimide Resin Molding Material |  |  |  |  |  |  |  |  |
| Flexural Strength (kgf/mm$^2$) | 13.0 | 13.2 | 13.4 | 14.0 | 13.0 | 12.9 | 13.0 | 14.4 |
| Flexural Modulus (kgf/mm$^2$) | 1500 | 1520 | 1490 | 1450 | 1480 | 1495 | 1580 | 1425 |
| Charpy Shock Strength (kgf · mm/mm$^2$) | 4.1 | 4.3 | 4.9 | 4.8 | 4.7 | 4.1 | 4.5 | 5.0 |
| Thermal Shock Resistance ($\infty$) | 10 | 14 | 16 | 21 | 20 | 17 | 15 | 32 |
| Glass Transition Temperature (°C.) | 198 | 199 | 195 | 194 | 194 | 199 | 197 | 193 |
| Thermal Coefficient | $1.5 \times 10^{-5}$ | $1.5 \times 10^{-5}$ | $1.5 \times 10^{-5}$ | $1.6 \times 10^{-5}$ | $1.5 \times 10^{-5}$ | $1.5 \times 10^{-5}$ | $1.5 \times 10^{-5}$ | $1.7 \times 10^{-5}$ |

TABLE 2-continued

|  |  |  |  |  |  |  |  |  |
|---|---|---|---|---|---|---|---|---|
| of Expansion (1/°C.) |  |  |  |  |  |  |  |  |
| Volume Resistivity [150° C.](Ω · cm) | $8.2 \times 10^{13}$ | $9.0 \times 10^{13}$ | $9.2 \times 10^{13}$ | $9.6 \times 10^{13}$ | $9.5 \times 10^{13}$ | $9.0 \times 10^{13}$ | $9.6 \times 10^{13}$ | $9.3 \times 10^{13}$ |
| Melting Viscosity [175° C.](poise) | 270 | 265 | 250 | 255 | 270 | 280 | 260 | 280 |
| Burr Length [5 μm](mm) | 2.1 | 1.9 | 1.6 | 1.4 | 1.8 | 2.0 | 2.0 | 1.3 |

|  | Comparative Example 1 | Comparative Example 2 | Comparative Example 3 | Comparative Example 4 | Comparative Example 5 | Comparative Example 6 |
|---|---|---|---|---|---|---|
| Used Novolak-type Phenolic Resin |  |  |  | BRG-555 | BRG-556 |  |
| Used Rubber-Modified Phenolic Resin | (I) | (J) | (K) |  |  |  |
| Phenolic Resin Molding Material |  |  |  |  |  |  |
| Flexural Strength (kgf/mm$^2$) | 9.0 | 10.0 | 11.0 | 12.5 | 12.4 |  |
| Flexural Modulus (kgf/mm$^2$) | 1200 | 1500 | 1440 | 1650 | 1660 |  |
| Charpy Shock Strength (kgf · mm/mm$^2$) | 7.5 | 8.0 | 8.0 | 7.4 | 7.3 |  |
| Thermal Shock Resistance (∝) | 6 | 7 | 7 | 4 | 5 |  |
| Epoxy Resin Molding Material |  |  |  |  |  |  |
| Flexural Strength (kgf/mm$^2$) | 11.0 | 13.5 | 13.2 | 15.0 | 15.0 | 12.8 |
| Flexural Modulus (kgf/mm$^2$) | 1350 | 1440 | 1430 | 1510 | 1520 | 1440 |
| Charpy Shock Strength (kgf · mm/mm$^2$) | 5.0 | 5.2 | 5.6 | 4.2 | 4.1 | 5.1 |
| Thermal Shock Resistance (∝) | 10 | 16 | 17 | 3 | 2 | 15 |
| Glass Transition Temperature (°C.) | 135 | 155 | 150 | 158 | 163 | 160 |
| Thermal Coefficient of Expansion (1/°C.) | $2.0 \times 10^{-5}$ | $2.1 \times 10^{-5}$ | $2.3 \times 10^{-5}$ | $1.8 \times 10^{-5}$ | $1.8 \times 10^{-5}$ | $1.8 \times 10^{-5}$ |
| Volume Resistivity [150° C.](Ω · cm) | $1.0 \times 10^{13}$ | $4.5 \times 10^{13}$ | $5.0 \times 10^{13}$ | $1.0 \times 10^{14}$ | $1.0 \times 10^{14}$ | $0.9 \times 10^{14}$ |
| Melting Viscosity [175° C.](poise) | 150 | 600 | 270 | 260 | 230 | 225 |
| Burr Length [5 μm](mm) | 11.0 | 2.5 | 2.7 | 3.0 | 3.2 | 2.8 |
| Polyimide Resin Molding Material |  |  |  |  |  |  |
| Flexural Strength (kgf/mm$^2$) | 12.1 | 12.7 | 12.0 | 11.2 | 11.0 |  |
| Flexural Modulus (kgf/mm$^2$) | 1460 | 1510 | 1590 | 1620 | 1670 |  |
| Charpy Shock Strength (kgf · mm/mm$^2$) | 3.8 | 3.7 | 3.9 | 3.6 | 3.7 |  |
| Thermal Shock Resistance (∝) | 4 | 3 | 11 | 2 | 1 |  |
| Glass Transition Temperature (°C.) | 162 | 192 | 190 | 202 | 205 |  |
| Thermal Coefficient of Expansion (1/°C.) | $1.8 \times 10^{-5}$ | $1.9 \times 10^{-5}$ | $2.0 \times 10^{-5}$ | $1.5 \times 10^{-5}$ | $1.5 \times 10^{-5}$ |  |
| Volume Resistivity [150° C.](Ω · cm) | $7.0 \times 10^{13}$ | $8.6 \times 10^{13}$ | $7.0 \times 10^{13}$ | $9.8 \times 10^{13}$ | $9.4 \times 10^{13}$ |  |
| Melting Viscosity [175° C.](poise) | 275 | 695 | 280 | 300 | 330 |  |
| Burr Length [5 μm](mm) | 8.7 | 3.0 | 2.7 | 4.0 | 3.6 |  |

As is apparent from Table 2, the rubber-modified phenolic resin of the present invention significantly improves the impact resistance and thermal shock resistance without degrading the electric properties of the phenolic resin composition, the epoxy resin composition, and the polyimide resin composition. In addition, as is apparent from Table 2, melting viscosities of the epoxy resin and polyimide resin compositions using the rubber-modified phenolic resin of the present invention are small, and burrs formed during molding of the compositions are short. Therefore, it is apparent that the rubber-modified phenolic resin of the present invention improves molding properties of the resin composition.

EXAMPLE 9

(a) 80 wt % of a novolak-type phenolic resin (phenol equivalent weight=1078) were heated and completely melted at 150° C.. 20 wt % of an ABS resin were added to the molten resin and the mixture was agitated for one hour so that the ABS resin was homogeneously dispersed in the phenolic resin. The resultant mixture was cooled to be solidified to prepare a desired rubber-modified phenolic resin.

(b) 18 wt % of a cresol novolak-epoxy resin (epoxy equivalent weight=215) and 12 wt % of the rubber-modified phenolic resin prepared in (a) were mixed with each other and ground using a Yariya grinder having a 2 mm screen. 65 wt % of a powder of fused silica and 5 wt % of other components were added to the ground mixture and the mixture was kneaded at 90° to 100° C. The resultant material was cooled and ground to prepare an encapsulant.

The prepared encapsulant was transfer injected in a mold heated to 175° C. and cured to prepare a molded product. A moisture resistance, a strain, a grain size of the ABS resin, and the like of the prepared molded product were tested.

EXAMPLE 10

10 wt % of the rubber-modified phenolic resin prepared in (a) of Example 9 were mixed with 20 wt % of a cresol novolak-epoxy resin (epoxy equivalent weight=215) and ground using a Yariya grinder having a 2 mm screen. 65 wt % of a powder of fused silica and 5 wt % of other components were added to the mixture to prepare an encapsulant and a molded product following the same procedures as in Example 9. The prepared molded product was tested following the same procedures as in Example 9.

COMPARATIVE EXAMPLE 7

9 wt % of a novolak-type phenolic resin (phenol equivalent weight=107), 2.5 wt % of an ABS resin, 65 wt % of a powder of fused silica, and 5 wt % of other components were added to 18.5 wt % of a cresol novolak-epoxy resin (epoxy equivalent weight=215) and the components were mixed at room temperature. The resultant mixture was kneaded at 90° to 100° C., cooled, and then ground, thereby preparing an encapsulant. A molded product was manufactured from the prepared encapsulant following the same procedures as in Example 9, and the manufactured molded product was tested following the same procedures as in Example 9.

COMPARATIVE EXAMPLE 8

10 wt % of a novolak-type phenolic resin (phenol equivalent weight=107), 65 wt % of a powder of fused silica, and 5 wt % of other components were added to and mixed with 20 wt % of a cresol novolak-epoxy resin (epoxy equivalent weight=215). An encapsulant and a molded product were prepared from the mixture following the same procedures as in Example 9. The molded product was tested following the same procedures as in Example 9.

EXAMPLE 11

(a) 80 wt % of a novolak-type phenolic resin (phenol equivalent weight=107) were heated and completely melted at 150° C. in a universal mixing machine. 20 wt % of an MBS resin were added to the molten phenolic resin and the mixture was agitated for one hour so that the MBS resin was homogeneously dispersed in the phenolic resin. Then, the resultant material was cooled to prepare a rubber-modified phenolic resin.

(b) 18 wt % of a cresol novolak-epoxy resin (epoxy equivalent weight=215) and 12 wt % of the rubber-modified phenolic resin prepared in (a) were mixed with each other and ground using a Yariya grinder having a 2 mm screen. 65 wt % of a powder of fused silica and 5 wt % of other components were mixed to the ground mixture at room temperature and the mixture was kneaded at 90° to 100° C. The resultant material was cooled and ground to prepare an encapsulant.

The prepared encapsulant was transfer injected in a mold heated to 175° C. and cured, thereby manufacturing a molded product. A moisture resistance, a strain, a grain size of an ABS resin, and the like of the molded product were tested.

EXAMPLE 12

A molded product was manufactured following the same procedures as in Example 11 except that 10 wt % of the rubber-modified phenolic resin prepared in (a) of Example 11 and 20 wt % of a cresol novolak-epoxy resin (epoxy equivalent weight=215) were used. Then, properties of the molded product as the same in Example 11 were tested.

COMPARATIVE EXAMPLE 9

9 wt % of a novolak-type phenolic resin (phenol equivalent weight=107), 2.5 wt % of an MBS resin, and 70 wt % of a powder of fused silica were added to 18.5 wt % of a cresol novolak-epoxy resin (epoxy equivalent weight=215) and the components were mixed at room temperature. Then, the mixture was kneaded at 90° to 100° C., cooled, and then ground, thereby preparing an encapsulant. A molded product was manufactured from the encapsulant following the same procedures as in Example 11, and the manufactured molded product was tested following the same procedures as in Example 11.

COMPARATIVE EXAMPLE 10

10 wt % of a novolak-type phenolic resin (phenol equivalent weight=107) and 70 wt % of a powder of fused silica were added to 20 wt % of a cresol novolak-epoxy resin (epoxy equivalent weight=215) and the components were mixed at room temperature. Then, the mixture was kneaded at 90° to 100° C., cooled, and then ground, thereby preparing an encapsulant. A molded product was manufactured from the encapsulant following the same procedures as in Example 11, and the manufactured molded product was tested following the same procedures as in Example 11.

Test results of Examples 9 to 12 and Comparative Examples 7 to 10 are summerized in Table 3.

In Table 3, a thermal cycle test, a moisture resistant test, a strain test, and measurement of a grain size of an ABS resin were performed as follows.

The thermal cycle test: in this test, a 30×25×5 mm molded product in which a 25×25×3 mm copper plate was embedded in a bottom surface was used. The molded product was alternately dipped in constant temperature baths of −40° C. and +200° C. for 30 minutes each 15 times. The numbers of formed cracks are listed in Table 3.

The moisture resistant test: the encapsulant was transfer molded at 170° C. for three minutes to mold an electronic component in which a device having aluminum circuits was sealed, and was cured at 180° C. for eight hours. The sealing electronic component manufactured as described above was subjected to the moisture resistant test in a high-pressure steam at 120° C. 100 sealed electronic components were subjected to this test, and a time required until 50% of disconnection (i.e., defective) occurs due to aluminum corrosion was measured.

The strain test: a commercially available strain gauge was adhered on an island portion of a DIP 16-pin lead frame and cured at 180° C. for eight hours, and then a strain was measured.

The grain size of the ABS resin: a section of the molded product manufactured by the encapsulant was observed with a microscope, and a maximum grain size of the ABS resin dispersed in the molded product was measured.

TABLE 3

| | Example | | Comparative Example | | Example | | Comparative Example | |
|---|---|---|---|---|---|---|---|---|
| Item | 9 | 10 | 7 | 8 | 11 | 12 | 9 | 10 |
| Characteristics | | | | | | | | |
| Volume Specific Resistivity ($\Omega \cdot$ cm) | $1 \times 10^{16}$ | $1 \times 10^{16}$ | $1 \times 10^{16}$ | $1 \times 10^{16}$ | $1 \times 10^{16}$ | $1 \times 10^{16}$ | $1 \times 10^{16}$ | $1 \times 10^{16}$ |
| Glass Transition Point (°C.) | 165 | 165 | 164 | 162 | 165 | 165 | 164 | 162 |
| Flexural Strength (kg/mm$^2$) | 13.2 | 13.7 | 13.2 | 15.2 | 14.3 | 14.7 | 14.2 | 15.2 |
| Flexural Modulus (kg/mm$^2$) | 1210 | 1245 | 1283 | 1510 | 1196 | 1225 | 1260 | 1510 |
| Strain (mm) | 2.2 | 2.0 | 1.9 | 1.6 | 3.7 | 2.5 | 3.2 | 1.6 |
| Thermal Cycle Test (number of cracks/ number of test pieces) | 1/20 | 2/20 | 4/20 | 10/20 | 0/20 | 0/20 | 1/20 | 10/20 |
| Moisture Resistant Test [PCT] (H) | 950 | 900 | 900 | 900 | 1200 | 1250 | 1000 | 900 |
| Strain Test ($\times 10^{-6}$) | −400 | −550 | −580 | −800 | −340 | −500 | −550 | −800 |
| Grain Size of ABS Resin (μm) | 50 | 50 | 200 | — | 50 | 50 | 200 | — |

As is apparent from Table 3, the ABS resin is sufficiently dispersed in the encapsulant of the present invention, and the encapsulant has good thermal shock resistance, moisture resistance, and low stress property.

As described above, when the rubber-modified phenolic resin of the present invention is used as a main resinous component for a phenolic resin composition or as a curing agent for an epoxy resin composition or a polyimide resin composition, an impact resistance and a thermal shock resistance of a cured product of these resin compositions are improved.

A stress of the encapsulant of the present invention using the rubber-modified phenolic resin as a curing agent for an epoxy resin composition is small when it is cured.

What is claimed is:

1. A rubber-modified phenolic resin comprising: a novolak; and an MBS resin dispersed, in the form of particles, each comprising a core and an outer layer, in the novolak, a part of the outer layer of the MBS resin being melted with the novolak.

2. A resin according to claim 1, wherein the core consists of a butadiene-styrene rubber, and the outer layer consists of a methyl methacrylate graft component which is graft-polymerized to the core.

3. A resin according to claim 1, wherein said novolak is at least one resin selected from the group consisting of a phenolic novolak, a cresol novolak, a tert-butyl phenolic novolak, a nonyl phenolic novolak, a phenolic aralkyl resin, and a dicyclopentadiene phenolic novolak.

4. A resin according to claim 1, wherein 2 to 100 parts by weight of said MBS resin are contained with respect to 100 parts by weight of said novolak.

* * * * *